March 30, 1965 — D. J. HOLTSLAG — 3,175,962

FALLING FILM EVAPORATOR

Filed Feb. 28, 1961 — 2 Sheets-Sheet 1

Inventor
David J. Holtslag
by Paul A. Frank
His Attorney

March 30, 1965　　　　D. J. HOLTSLAG　　　　3,175,962
FALLING FILM EVAPORATOR
Filed Feb. 28, 1961　　　　　　　　　　　　　　2 Sheets-Sheet 2
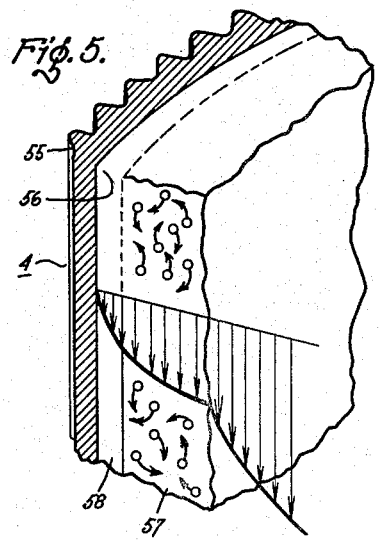
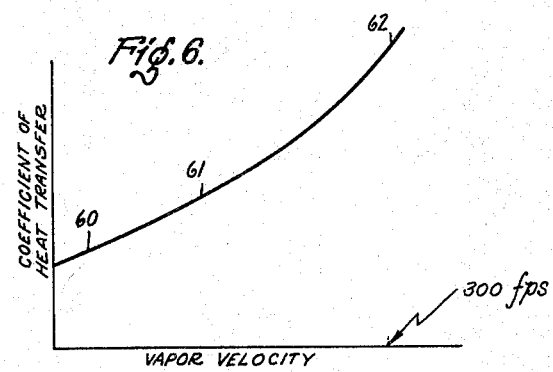
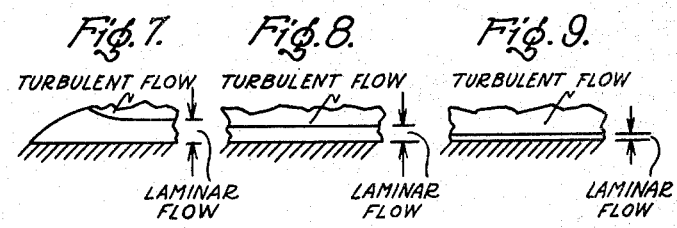
Inventor
David J. Holtslag
by Paul G. Frank
His Attorney

United States Patent Office 3,175,962
Patented Mar. 30, 1965

3,175,962
FALLING FILM EVAPORATOR
David J. Holtslag, Schenectady, N.Y., assignor to General
Electric Company, a corporation of New York
Filed Feb. 28, 1961, Ser. No. 92,349
8 Claims. (Cl. 202—236)

The present invention relates to heat exchange apparatus, and more particularly, to improved heat exchange apparatus for utilization in distillation processes.

In the copending application of Edward L. Lustenader and Dale H. Brown, entitled, "Method and Apparatus for Heat Exchange," Serial No. 44,146, filed July 20, 1960, now Patent No. 3,099,607, and assigned to the assignee of the present application there is shown a distillation apparatus including an upper chamber into which a plurality of tubes extend, each tube having weir constructions for passing a film of distilland into each tube. As the distilland film passes down each tube, a portion thereof is evaporated forming a vapor stream passing in the same direction as the distilland. With the generation of more and more vapor, the velocity of the vapor increases so that the distilland which initially flows in substantially laminar or streamline flow, because of the frictional drag or vapor shear effect of the flowing vapor causes turbulence to occur in the adjacent portions of the distilland film. As the velocity of the vapor increases, the turbulence extends more deeply into the distilland film until a laminar sublayer having streamline flow may exist having a thickness less than approximately one-thousandth of an inch. The vapor so formed is ultimately discharged from the bottom of these tubes and may be suitably condensed to form distillate liquid. If desired, a portion of the fluid may be recirculated by being introduced into the upper chamber and passed through the tubes to maintain a high velocity vapor stream passing throughout the length of each tube thereby assuring a high heat transfer coefficient along the entire length of the tubes.

It has been found that a turbulent film of distilland presents substantially no resistance to heat transfer. This may be explained as being due to the turbulent nature of the film wherein there occurs continuous erratic movement of portions of the liquid in eddies. Heat is transferred through such turbulent films by the erratic movement of these portions which comprise particles or packets which transfer the heat freely across the film in turbulence. The portion of the film adjacent the tube wall resists such turbulence to varying degrees forming a sublayer in streamline flow and heat transfer through such a sublayer is performed by conduction. Heat transfer by conduction under such circumstances incurs substantial thermal resistance. By controlling the degree of turbulence so that the sublayer in laminar flow is maintained small, the thermal resistance is decreased and heat transfer through the entire film is performed with a high heat transfer coefficient. Since a desired degree of turbulence may not be present at the upper portions of the tube, recirculation of vapor may be utilized to assure the turbulence occurs in the distilland film adjacent the top of the tubes.

The chief object of the present invention is to provide an improved apparatus for heat exchange employing an evaporation process utilizing a turbulent film of liquid.

Another object of the invention is to provide an improved heat exchange member having an evaporating surface upon which a high heat transfer coefficient may be uniformly experienced.

A still further object of the invention is to provide a distillation apparatus having improved heat exchange members with evaporating surfaces for applying a distilland film thereon to achieve high heat transfer in a manner wherein turbulence is maintained along substantially the entire length of the distalland film with a small sublayer of distilland in laminar flow.

These and other objects of my invention will be more readily perceived from the following description.

Briefly stated, the present invention relates to a distillation apparatus wherein distilland is flowed over a stationary heat exchange surface placing the distilland in heat exchange relation with medium on the opposite side of the heat exchange member. The evaporating surface of the heat exchange member defines a longitudinal passage which is so proportioned that vapor being generated from the distilland passes therefrom at a velocity sufficient to create turbulence in a substantial portion of the distilland film whereby only a small sublayer of distilland film having laminar flow exists between the evaporating surface and the distilland in turbulent flow. The term "distilland" as used herein denotes any liquid which is being evaporated.

The attached drawings illustrate preferred embodiments of the invention, in which:

FIGURE 5 is a fragmentary perspective view of a section of heat exchange surface in the apparatus in FIGURE 1 illustrating the condition of the film being evaporated thereon;

FIGURE 6 is a diagram plotting the heat transfer coefficient vs. velocity of the distilland in apparatus employing the present invention; and, FIGURES 7, 8, and 9 are cross-sectional views of the distilland film on a heat exchange surface showing the effects of turbulence on the flow of distilland.

Figure 1:
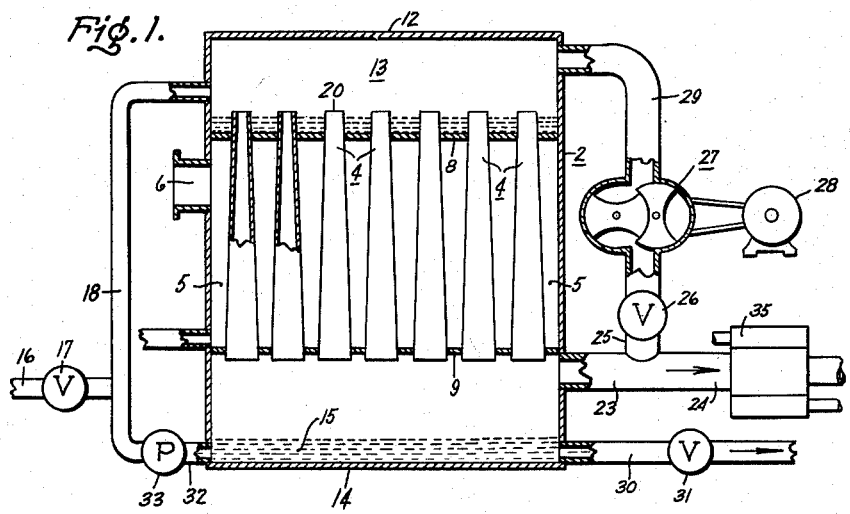
FIGURE 1 is a diagrammatic view of a modified falling film type evaporator for practicing the present invention.

While the practice of the present invention is not restricted to the type of apparatus illustrated herein, falling film type apparatus as illustrated in FIGURE 1 with suitable modifications lend themselves especially to the practice of the present invention. In FIGURE 1 there is shown an apparatus comprising a shell 2 which envelopes a plurality of tubes 4. Shell 2 with upper barrier 8 and lower barrier 9 define jacket 5 about tubes 4 into which a heat exchange medium such as steam may be introduced to evaporate liquid placed within the tubes. The heat exchange medium may be introduced into jacket 5 through nozzle 6. Steam or other heat exchange medium vapor condenses on the outside surfaces of tubes 4 to form condensate in the lower portion of jacket 5, the condensate being discharged therefrom through conduit 7.

The liquid to be evaporated which may be a saline solution, such as sea water, may be introduced into the system through conduit 16 and valve 17 to supply conduit 18 which discharges the liquid into upper chamber 13, said chamber being substantially defined by end member 12 and barrier 8. The upper ends of tubes 4 which protrude and extend above barrier 8 may include weir means 20 which distribute the liquid along the inner periphery of tubes 4 in a manner to define an annular thin film preferably having a thickness as great as approximately ¼ inch.

This film is placed in heat exchange relation with the condensing vapor in steam jacket 5 in a manner described more fully hereinafter.

The distilland may flow downwardly over the inner surface of the tubes and a portion thereof evaporates to form distillate vapor which passes downwardly into sump 15, sump 15 being substantially defined by end member 14. The remaining distilland which is in a concentrated form, flows into sump 15 from whence it may be recirculated through conduit 32, pump 33 to supply conduit 18 which reintroduces a portion of the distilland into upper chamber 13. Makeup distilland is introduced through the previously mentioned conduit 16. In order to maintain a desired concentration of distilland in sump 15, a portion of the solution may be removed through conduit 30, the amount removed being controlled by valve 31.

The vapor being discharged from tubes 4 is passed through conduits 23 and 24 and, if desired, through conduit 25. Conduit 24 may be connected to suitable condensing unit 35 wherein the vapor is condensed by being placed in heat exchange relation with cooling medium to form potable water from the condensate. If desired, the entire vapor evolved from the distilland may be compressed in a manner wherein a substantial portion of the vapor is introduced into nozzle 6 to form the heat exchange medium for evaporating the distilland in the tubes, such compression distillation apparatus being well known in the art.

If desired, the vapor may be partially recirculated through conduit 25 and the amount of recirculated vapor may be controlled by valve 26 or by a speed variation in compressor 27. The vapor is suitably compressed in compressor 27 which may be a Roots blower type apparatus driven by motor 28, the compressed vapor being discharged through conduit 29 into upper chamber 13. It will also be appreciated that under certain circumstances, it may be desirable not to recirculate the vapor in which instance, valve 26 may be completely closed, the necessary vapor velocity being derived by the rapid generation of vapor in tubes 4.

Figure 2:
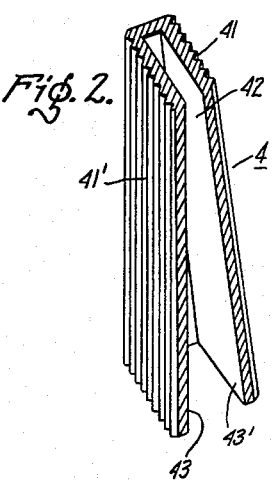
FIGURE 2 is a fragmentary sectional view in perspective of a heat exchange member which may be employed in the apparatus in FIGURE 1.

FIGURE 2 shows a preferred type of heat exchange member which may be used as tube 4 in FIGURE 1. In FIGURE 2 the heat exchange member generally comprises two planar portions 41 and 41' which may, if desired, be constructed in accordance with the teaching in the copending application of R. Richter, Serial No. 806,-185, filed April 13, 1959, entitled, "Heat Exhange Apparatus and Condensing Surface," now abandoned, which is assigned to the assignee of the present application. This surface increases the effectiveness of the condensing area by reducing heat transmission resistance at the condensing surface by removing the condensing film through the utilization of controlled film-wise condensation. This surface may comprise a plurality of condensing crests and drainage valleys whereon condensation occurs in such a manner that surface tension of the condensed liquid on the crests rapidly removes condensate into the drainage valleys and from the surface. In this manner, extremely high heat transfer coefficients from the vapor to the surface may be achieved. On the opposite side of portions 41 and 41' may be located substantially planar evaporating surfaces 43 and 43' which form a tapered passage 42 of increasing cross-sectional area. In operation, liquid passing along the inner surfaces 43 and 43' clings thereto and as the distillate vapor is generated in greater quantities, the passage 42 increases in cross-sectional area so as to maintain a substantially constant velocity of vapor flow through passage 42 for a purpose more fully described hereinafter.

Figure 3:
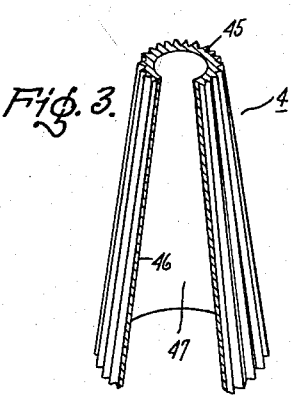
FIGURE 3 is a fragmentary perspective view of another embodiment of the heat exchange member which may be employed in the apparatus in FIGURE 1.

FIGURE 3 discloses another embodiment of a heat exchange member which may be utilized in the apparatus in FIGURE 1. In this particular embodiment, tubes 4 may comprise substantially conical condensing surface 45 also constructed, if desired, in accordance with the teaching of the previously mentioned Richter application wherein controlled film-wise condensation occurs. Inner evaporating surface 46 comprises a uniform surface having a general frusto-conical shape which defines a passage 47 of increasing cross-sectional area in a downward direction.

Figure 4:
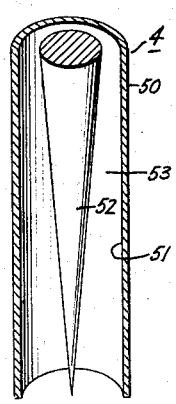
FIGURES 4 and 4a are fragmentary perspective views of other embodiments of the heat exchange member which may be employed in the apparatus shown in FIGURE 1.

In FIGURE 4 there is shown another embodiment of tube 4 in which the condensing surface rather than being fluted in the manner of the teaching of the Richter application is provided with a substantially smooth surface 50. The condensing surface 50 may be treated to promote dropwise condensation by utilization of a suitable chemical promoter or by utilization of a construction such as described in the copending application of F. J. Neugebauer and E. L. Lustenader, Serial No. 20,600, filed April 7, 1960, entitled, "Method and Apparatus for Distillation," which is also assigned to the assignee of the present application. Passage 53 defined by wall 51 in FIGURE 4 to achieve an increasingly cross-sectional area, utilizes a conical baffle 52 which tapers in a downward direction thereby increasing the annular areas defined by baffle 52 and wall 51. If desired, the condensing surface 50 may be fluted as shown in FIGURE 4a in accordance with the teaching of the previously identified Richter application.

Figure 4A:
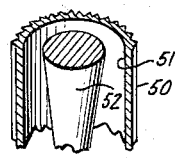

From the consideration in FIGURES 2, 3, 4, and 4a, it can be seen that in FIGURES 2 and 3, the increased cross-sectional area is supplied by tapering the surfaces which define the passages through tubes 4. In the case of FIGURES 4 and 4a, however, the increased cross-sectional area of the passage through tube 4 is provided by the utilization of a conical baffle in a cylindrical tube.

In the operation of the apparatus shown in FIGURE 1 steam or other heat exchange medium is introduced into nozzle 6 and the vapor is condensed on the outside surfaces of tubes 4. The outside surfaces of tubes 4 are preferably, as previously noted, of the type wherein dropwise condensation or controlled filmwise condensation occurs. The vapor is condensed in the steam jacket so that the coefficient of heat transfer from the vapor to the surface is extremely high because of the use of these specalized condensing surfaces. The condensed vapor may be discharged from the jacket through conduit 7.

Distilland such as saline water may be introduced into the upper chamber 13 and because of the weir construction 20 associated with each tube 4, a film of distilland less than approximately ¼ inch is formed on the inner surfaces of the tubes. As the liquid passes down each tube, a portion thereof is evaporated forming a vapor stream passing in the same direction (downwardly) as distilland flow. In tubes of uniform or constant cross section, as more and more vapor is generated, the velocity of the vapor tends to increase. In such tubes (uniform cross section), the velocity of the vapor increases so that distilland which is initially flowing in substantially laminar flow, because of frictional drag or vapor shear of the flowing vapor, causes turbulence to occur in the adjacent portions of distilland film. As the velocity of the vapor increases, the turbulence extends more deeply into the distilland film until only a laminar sublayer less than approximately one-thousandth of an inch exists adjacent the tube surface. The vapor is ultimately discharged from tube 4 to conduit 24. In the event that the recirculating path through line 25, pump 27, line 29 into upper chamber 13 is utilized, the vapor is again passed through tubes 4. The recirculated vapor introduced in the upper chamber 13 maintains a high velocity vapor stream passing through the entire length of the tube so that the desired amount of turbulence exists in the entire tube length thereby assuring high heat transfer.

FIGURE 5 illustrates an enlarged sectional view of a sector of tube 4. Tube 4 comprises an outer surface 55 which in this embodiment has parallel undulations or flutes in accordance with the teaching of the previously mentioned Richter application so that vapor condenses and because of the contour or fluted nature of the surface, the surface tension of the condensed vapor substantially causes all drainage of condensate to occur in the fluted channels. Distilland film may be passed down inner wall 56 of the tube and this flow is shown as having a turbulent portion 57 which is a substantial portion of the film and a sublayer 58 in laminar flow. The flow of vapor and the distilland film is in the same direction in this embodiment. As mentioned in the previously cited application of Edward L. Lustenader and Dale H. Brown, it has been found that a turbulent film presents substantially no resistance to heat transfer. This has been explained as being due to the turbulent nature of the film wherein there occurs a continuous erratic movement of portions of the liquid in eddies. Heat is transferred through such a turbulent film by the erratic movement of these portions which comprise particles or packets which transfer the heat freely across the film in turbulence. The portion of the film adjacent the wall resists such turbulence to varying degees forming a sublayer in streamline flow and heat transfer through such sublayer in steamline or laminar flow is performed by conduction which is accompanied by substantial thermal resistance. By controlling the degree of turbulence so that the sublayer in laminar flow is maintained small, this thermal resistance is low and heat transfer through the entire film is performed with a high over-all heat transfer coefficient. FIGURE 5 also illustrates the comparative velocities of portions of the fluids flowing over the heat exchange surface. Adjacent the surface 56 the velocity of the distilland is substantially zero and increases rapidly to the point where turbulent flow begins. The velocity of the distilland from the boundary area between turbulent flow and laminar flow increases continuously but more slowly towards the film surface.

In FIGURE 6 there is plotted the coefficient of heat transfer vs. the vapor velocity in an apparatus for practicing the invention. It is noted that with the vapor velocity low, the heat transfer coefficient is also low, as shown at point 60. As the velocity increases, for example, at point 61, the coefficient of heat transfer also increases and at point 62 which is shown in the diagram indicating a velocity of approximately 300 ft. per second there is a substantial increase in the coefficient of heat transfer.

This increase in heat transfer may be explained in accordance with the previously mentioned description and by reference to FIGURES 7, 8, and 9. FIGURE 7 indicates a situation where the velocity is low such as at the entrance to a uniform cross-section tube. Under such circumstances a substantial portion of the film is in laminar flow with a small amount in turbulent flow. Since conduction plays a major portion of the heat transfer in this case, the heat transfer coefficient is low because of the associated high thermal resistance which accompanies conductive heat transfer. As the velocity of the vapor stream adjacent the film increases, the amount of liquid in laminar flow decreases (FIGURE 8) and the amount of liquid in turbulent flow increases resulting in an increase in heat transfer coefficient as shown at point 61 in FIGURE 6. With increased velocity, the heat transfer at point 62 in FIGURE 6 is achieved and this is shown in FIGURE 9 where most of the liquid is in turbulent flow with possibly a thickness of approximately one-thousandth of an inch being in laminar flow.

From a consideration of FIGURES 5–9, it can be seen that the amount of liquid in streamline flow, namely, the portion 58 in FIGURE 5, should be maintained especially small, for example, as shown in FIGURE 9 wherein a film of approximately one-thousandth of an inch is maintained. With such flow conditions, a high heat transfer coefficient may be achieved as shown at point 62 in the curve illustrated in FIGURE 6. In the operation of the apparatus as disclosed in the previously mentioned Lustenader and Brown application (tubes of uniform or constant cross section) the heat transfer coefficient may vary along the length of the heat exchange tube 4 as a result of varying vapor velocities. The present invention maintains a substantially uniform high velocity vapor flow through each tube 4 in such a manner that the heat transfer coefficient is maintained high for the entire surface. In order to achieve an over-all high heat transfer coefficient, the present invention presents condensing surfaces treated or constructed to promote dropwise condensation or controlled filmwise condensation.

With respect to the evaporating portion of the tube, the tube passages are substantially restricted at the upper portions thereof so that the generation of vapor from the evaporating surfaces causes the vapor to have substantial velocity. This velocity may be maintained and regulated by controlling the cross-sectional area of the passage throughout tube 4. This is achieved by tapering the tube in an expanding manner so that as more and more vapor is generated, the velocity of vapor through the tube may be, if desired, maintained substantially constant and preferably at a rate, for example, as shown in FIGURE 6 of the order of 300 ft. per second. In this manner, the over-all heat transfer coefficient at the upper portion of each tube 4 will be substantially as high as the heat transfer coefficient of the tube in the lower portions thereof.

This result may be achieved by utilizing the specific construction in FIGURE 2 wherein liquid is passed down surfaces 43 and 43' and as the liquid continues to pass downwardly the vapor generated is accommodated by the increasing cross-sectional area of passage 42 defined by walls 43 and 43'. In the embodiment of FIGURE 3, this increase in cross-sectional area is provided by the frusto-conical shape surface 46 which defines passage 47. In the embodiments of FIGURES 4 and 4a, this increase in cross section is provided by mounting within tube 4 a conical baffle which in the upper portions defines an expanding passage having a cross section which is annular in shape. The additional area in the passage is supplied by the decreasing cross-sectional area of baffle 53.

By utilizing the apparatus in FIGURE 1 with the heat exchange members constructed according to the invention as illustrated in FIGURES 2, 3, and 4, in many instances the use of recirculating pump 27 is made unnecessary and the valve 26 may be maintained closed since the particular heat exchange construction provides means for maintaining a high velocity vapor flow through the tubes. However, if desired, it may be possible to control the velocity of the vapor by utilizing the pump 27 to recirculate a desired amount of fluid at a given velocity to achieve a higher heat transfer than would be normally achieved by only utilizing the physical attributes of tubes 4.

The present invention is directed to an improved apparatus for heat exchange and especially for distillation wherein high heat transfer may be realized by utilizing a turbulent distilled film with means for controlling the turbulent film. The control means regulates the vapor flow velocity which causes the turbulence and in the preferred embodiment, the turbulence is maintained at a substantially uniform level throughout the tubes.

While I have described preferred embodiments of my invention, it will be understood that the invention is not limited thereto since it may be otherwise embodied within the scope of the appended claims.

What I claim as new and desire to secure by Letters Patent of the United States is:

1. In a distillation apparatus, the combination of a stationary heat exchange wall member defining an evaporating surface opposite a condensing surface, said heat exchange wall member defining a longitudinal tapered passage means of gradually increasing cross-sectional area in the direction of flowing distilland, means for flowing distilland over the evaporating surface as a thin film, means for passing a condensible heat exchange medium in contact with the condensing surface of the heat exchange wall member to condense heat exchange medium on the condensing surface thereby placing the heat exchange medium in heat transfer relation with the distilland on the evaporating surface to evaporate a substantial portion of distilland film, and means for recirculating a portion of the vapor formed from the distilland film to pass the vapor over the evaporating surface to maintain a desired level of turbulence in the distilland film flowing over the evaporating surface.

2. In a distillation apparatus, the combination of a stationary heat exchange wall member defining an evaporating surface opposite a condensing surface, said heat exchange wall member defining a longitudinal tapered passage means of gradually increasing cross-sectional area in the direction of flowing distilland, means for flowing distilland over the evaporating surface as a thin film, means for passing a condensible heat exchange medium in contact with the condensing surface of the heat exchange wall member to condense heat exchange medium on the condensing surface thereby placing the heat exchange medium in heat transfer relation with the distilland on the evaporating surface to evaporate a substantial portion of the distilland film, said passage means being proportioned to generate distillate vapor at a rate sufficient to create a vapor stream adjacent the distilland film to create turbulence in a substantial portion of the flowing distilland film and to form a sublayer of distilland having laminar flow with a thickness less than approximately one-thousandth of an inch between the evaporating surface and distilland film in turbulent flow to evaporate a substantial portion of the distilland film.

3. In a distillation apparatus, the combination of a stationary heat exchange wall member defining an evaporating surface opposite a condensing surface, said heat exchange wall member defining a longitudinal tapered passage means formed by connected angularly disposed planar walls giving the passage means a gradually increasing cross-sectional area, in the direction of flowing distilland, said condensing surface having parallel undulations which define outwardly projecting condensing areas spaced by inwardly projecting drainage areas, means for flowing distilland over the evaporating surface of the heat exchange wall member as a thin film, means for passing a condensible heat exchange medium in contact with the condensing surface to condense the heat exchange medium on the condensing surface thereby placing the heat exchange medium in heat transfer relation with the distilland on the evaporating surface to evaporate a substantial portion of the distilland film, said passage means being proportioned to generate distillate vapor at a rate to create a vapor flow sufficient to maintain turbulence in a substantial portion of the adjacent flowing distilland film to form a sublayer of distilland having laminar flow with a thickness less than approximately one-thousandth of an inch between the evaporating surface and the distilland film in turbulent flow.

4. In a distillation apparatus, the combination of a stationary heat exchange wall member defining an evaporating surface opposite a condensing surface, said heat exchange wall member defining a longitudinal tapered passage means of general frusto conical shape giving the passage means a gradually increasing cross-sectional area in the direction of flowing distilland, means for flowing distilland over the evaporating surface as a thin film, means for passing a condensible heat exchange medium in contact with the condensing surface of the heat exchange wall member to condense heat exchange medium on the condensing surface thereby placing the heat exchange medium in heat transfer relation with the distilland on the evaporating surface to evaporate a substantial portion of the distilland film, said condensing surface having parallel undulations which define outwardly projecting condensing areas separated by inwardly projecting drainage areas whereby heat exchange medium condensed on the condensing areas as a result of surface tension is drawn into the drainage areas, said passage means being proportioned to cause the generation of vapor at a rate sufficient to maintain turbulence in the adjacent falling distilland film to form a sublayer of distilland having laminar flow with a thickness less than approximately one-thousandth of an inch between the evaporating surface and distilland film in turbulent flow.

5. In a distillation apparatus, the combination of a stationary heat exchange wall member defining an evaporating surface opposite a condensing surface, said heat exchange wall member substantially enveloping a baffle having a general conical shape to define a longitudinal tapered passage means of gradually increasing cross-sectional area in the direction of flowing distilland, means for flowing distilland over the evaporating surface as a thin film, means for passing a condensible heat exchange medium in contact with the condensing surface of the heat exchange wall member to condense heat exchange medium on the condensing surface thereby placing the heat exchange medium in heat transfer relation with the distilland on the evaporating surface to evaporate a substantial portion of the distilland film, said passage means defined by the evaporating surface and the conical baffle being proportioned to cause a generation of vapor at a rate sufficient to maintain turbulence in a substantial portion of the distilland film and to form a sublayer of distilland having laminar flow with a thickness less than approximately one-thousandth of an inch between the evaporating surface and the distilland film in turbulent flow.

6. In a distillation apparatus, the combination of a stationary heat exchange wall member defining an evaporating surface opposite a condensing surface, said heat exchange wall member defining a longitudinal tapered passage means of gradually increasing cross-sectional area in the direction of flowing distilland, the passage means being tapered so that the increase in cross-sectional area is proportioned to fully compensate for the increase in flow of vapor through the passage means, means for flowing distilland over the evaporating surface as a thin film, means for passing a condensible heat exchange medium in contact with a condensing surface of the heat exchange wall member to condense heat exchange medium on the condensing surface thereby placing the heat exchange medium in heat transfer relation with the distilland on the evaporating surface to evaporate a substantial portion of distilland film, and means for recirculating a portion of the vapor formed from the distilland film to pass the vapor over the evaporating surface to maintain a desired level of turbulence in the distilland film flowing over the evaporating surface.

7. In a distillation apparatus, the combination of a stationary heat exchange wall member defining an evaporating surface opposite a condensing surface, said heat exchange wall member defining a longitudinal tapered passage means of gradually increasing cross-sectional area in the direction of flowing distilland, the passage means being tapered to increase in cross-sectional area so as to fully compensate for the increase in flow of vapor through said passage means and thereby maintain a uniform velocity and heat transfer coefficient through the passage means, means for flowing distilland over the evaporating surface as a thin film, means for passing a condensible heat exchange medium in contact with the condensing surface of the heat exchange wall member to condense heat exchange medium on the condensing surface thereby placing the heat exchange medium in heat transfer relation with the distilland on the evaporating surface to evaporate a substantial portion of distilland film, said passage means being proportioned to generate distillate vapor at a rate sufficient to create a vapor stream adjacent the distilland film to create turbulence in a substantial portion of the flowing distilland film, and to form a sublayer of distilland having laminar flow with a thickness less than approximately 1-thousandth of an inch between the evaporating surface and distilland film in turbulent flow to evaporate a substantial portion of the distilland film.

8. In a distillation apparatus, the combination of a stationary heating exchange wall member defining an evaporating surface opposite a condensing surface, said heat exchange wall member defining a longitudinal tapered passage means formed by connected angularly disposed planar walls giving the passage means a gradually increasing cross-sectional area in the direction of flowing distilland, the cross-sectional area increasing in size so as to fully compensate for the increase in the flow of vapor through said passage means and thereby maintain a uniform velocity and heat transfer coefficient throughout the passage means, said condensing surface having parallel undulations which define outwardly projecting condensing areas spaced by inwardly projecting drainage areas, means for flowing distilland over the evaporating surface of the heat exchange wall member as a thin film, means for passing a condensible heat exchange medium in contact with a condensing surface to condense the heat exchange medium on the condensing surface thereby placing the heat exchange medium in heat transfer relation with the distilland on the evaporating surface to evaporate a substantial portion of the distilland film, said passage means being proportioned to generate distillate vapor at a rate to create a vapor flow sufficient to maintain turbulence in a substantial portion of the adjacent flowing distilland film to form a sublayer of distilland having laminar flow with a thickness less than approximately 1-thousandth of an inch between the evaporating surface and the distilland film in turbulent flow.

References Cited by the Examiner
UNITED STATES PATENTS

| | | | |
|---|---|---|---|
| 1,425,005 | 8/22 | Gensecke | 159—24 |
| 2,018,163 | 10/35 | Wells. | |
| 2,069,389 | 2/37 | Peebles. | |
| 2,273,767 | 2/42 | Upton | 122—501 X |
| 2,440,245 | 4/48 | Chevigny. | |
| 2,445,471 | 7/48 | Buckholdt. | |
| 2,519,618 | 8/50 | Wilson et al. | |
| 2,732,008 | 1/56 | Seeley | 159—28 |
| 3,099,607 | 7/63 | Lustenader et al. | 202—75 |

NORMAN YUDKOFF, *Primary Examiner.*

GEORGE D. MITCHELL, MILTON STERMAN, ALPHONSO D. SULLIVAN, *Examiners.*